United States Patent [19]

Guyette et al.

[11] Patent Number: 4,564,903
[45] Date of Patent: Jan. 14, 1986

[54] PARTITIONED MULTIPROCESSOR PROGRAMMING SYSTEM

[75] Inventors: Richard R. Guyette, San Jose, Calif.; Eddie T. Hall, Millbrook, N.Y.; Allan S. Meritt, Poughkeepsie, N.Y.; Stephen R. Newson, Woodstock, N.Y.; Casper A. Scalzi, Poughkeepsie, N.Y.; Glenn W. Sears, Jr., Ulster Park, N.Y.

[73] Assignee: International Business Machines Corporation, Armonk, N.Y.

[21] Appl. No.: 539,762

[22] Filed: Oct. 5, 1983

[51] Int. Cl.⁴ ............................................. G06F 15/16
[52] U.S. Cl. .................................... 364/300; 364/200
[58] Field of Search ................. 364/200 MS File, 300

[56] References Cited

U.S. PATENT DOCUMENTS

| | | | |
|---|---|---|---|
| 4,187,538 | 2/1980 | Douglas et al. | 364/200 |
| 4,292,669 | 9/1981 | Wollum et al. | 364/200 |
| 4,455,605 | 6/1984 | Cormier et al. | 364/200 |

*Primary Examiner*—Raulfe B. Zache
*Attorney, Agent, or Firm*—Bernard M. Goldman

[57] ABSTRACT

The disclosure provides a unique multiprocessing (MP) method for executing on plural CPUs of the MP a uniprocessor system (UPS) program not written to run on a MP system. Separate copies of the UPS are provided in the shared main storage (MS) of the MP. A hypervisor type of control program (called a partitioned multiprocessing system, PMP) uses the MP method to enable simultaneous execution of the plural copies of a UPS on different CPUs of the MP as UPS guest virtual machines. PMP can dedicate any CPU to the sole execution of a particular copy of UPS. The copies of the UPS run on the different CPUs independently of each other, but they may share I/O devices.

21 Claims, 9 Drawing Figures

FIG. 3 (MAIN STORAGE MAP)

FIG. 4 (VM PMP PROGRAM DISPATCHER ON EACH CPU)

PARTITIONED MULTIPROCESSOR PROGRAMMING SYSTEM

INTRODUCTION

This invention relates to a method and means for enabling a programming system which is designed for operation on a uniprocessor to utilize a multiprocessor (MP) built with System/370XA (Extended Architecture).

PRIOR ART

Virtual machine (VM) hypervisor programs have been in public use for many years, e.g. IBM VM/System Product (SP). VM/SP normally is loaded into the high address end of main storage and coordinates the running of programs by a plurality of users who respectively interface a large system from a typewriter/display terminal which is usually distant from the central processing unit (CPU) and the main storage (MS) of the system. The advantage of VM is that it gives each of its users the apparent data processing power of a large system. The users (who are sometimes called "guests" of the VM "host") are assigned by the VM control program to different MS areas in which to operate as the user performs work on the system. Logon is a procedure in which the user identifies himself to the system and requests permission to use the system. After logon, guests may run any type of program that is designed to interface the architecture of the connected system, e.g. the S/370 architected instruction set may be used by any guest program running on a S/370 system. Operating systems, such as MVS, have been run as guests under VM/SP. Each guest manages the assigned part of MS, which is called guest real storage since to the guest operating system this is the system storage under its control. Under the VM operation, however, guest real storage is actually virtual storage and must be mapped to VM host's real storage as required. A simplification, generally resulting in better performance for one preferred guest, has been done by assigning the low order address part of MS (host real) to the equivalent addresses of the guest operating system (guest real) beginning at absolute address zero. Such a guest is called a Virtual = Real (V = R) guest. Other guests will operate out of other MS address areas.

Whenever during guest program execution, the guest requires I/O and tries to issue a start I/O instruction (SIO or SIOF), the guest is not permitted to do so, because the guest's channel program will not operate when the VM location of the guest is in a MS area different from the area the channel program was written to use. Therefore, VM causes the guest's program execution to be interrupted when a guest tries to issue a SIO or SIOF instruction, and then VM takes over the process of doing the guest's program for the guest. To do the guest I/O, VM first finds the guest's channel program by going to location 72 in the guests PSA page frame (i.e. the guest's page zero) to obtain the channel address word (CAW) which contains the address of the first channel command word (CCW) in the guest's channel program. In order to locate the first CCW in MS, VM translates this obtained first CCW address to its absolute address in MS by adding the MS offset of the guest area in MS (i.e. from MS absolute address zero) to the first CCW address. Then VM makes a pass through the channel program to determine which page in the guest's area are needed for the data being transferred, and VM fixes these page frames in preparation for the I/O data transfer. Then VM copies the channel program into the VM area and changes the addresses within its CCWs to the absolute addresses (which are required by the I/O channel hardware) to be accessed in the newly fixed page frames in the guest area for the I/O data transfer. Finally, VM starts execution of the I/O channel program built in the VM area to perform the I/O transfer required by the guest. Hence, it is apparent that guest I/O operation under VM involves a significant amount of VM programming overhead which does not exist when the user program is executed as a program in the MS area for which it was written.

The added VM overhead of address relocation of its guest I/O channel programs has been recognized as burdensome, but no generalized way has been found to avoid it, except for the first guest loaded at absolute address zero which is sometimes called a preferred guest, or a V = R (virtual equals real) user because the low address part of the preferred guest's virtual address space is mapped directly onto the MS real address range beginning at real address zero. (Real addresses are the same as absolute addresses in a uniprocessor (UP), but they are not the same in a multiprocessor (MP).) This virtual-to-real address mapping eliminates virtual address translation for the preferred guest only and it permits I/O channel programs of the guest to be used without relocation. However, guests other than the first guest cannot be V = R guests, and VM must handle their I/O channel programs in the above described burdensome manner.

The added burden of VM handling of non-preferred guests I/O channel programming becomes significant only for non-preferred guests that have a large amount of I/O activity. The result is that programs having large amounts of I/O activity cannot be efficiently handled by VM except as a preferred guest, and only one preferred guest can be handled by VM. This VM limitation occurs whether VM is being run on a UP or an MP, because the main storage of either has only a single expanse of absolute addresses (absolute addresses are the same as real addresses in a UP). This VM limitation in a MP is that only one CPU in a MP can execute the one preferred guest in the system. Any other CPU in the MP executing a non-preferred guest has the same added burden of VM guest I/O handling as in a UP.

A solution to the I/O burden for an MP is to redesign the program in read only form with proper internal programmed locks so that it can directly execute simultaneously on the plural CPUs. This involves having only one copy of the program in MS beginning at absolute address zero, and this copy is simultaneously and independently being executed on the plural CPUs with necessary program coordination being maintained by the internal programmed locks.

Unfortunately, the redesign of a complex UP program for MP operation is expensive and takes a long period of time to complete in a reasonably error free manner. A number of uniprocessor programming systems (UPSs) have been written, and many UPS programs contain real addressing (rather than virtual addressing) for running on uniprocessor (UP) systems. The S/370 ACP and TPF programs are examples of UPSs. These programs use 24 bit real addresses, have very large amounts of I/O activity, and are not designed to directly run on a MP. They are not designed with the internal locks required to maintain the integrity of the program while this UPS is running directly under its own control on plural CPUs in the single range of real addresses for which the single executing copy of this UPS program is designed.

The I/O handling burden becomes excessive for ACP/TPF if it is run simultaneously on plural CPUs of an MP using plural copies of the program as different guests under conventional VM control. This is because programmed interpretation and relocation of the channel programs would be required for all copies except the first. This is particularly true of ACP/TPF which is required to handle a very high frequency of I/O operations.

In MP main storage (using tight-coupling), CPU requested real addresses are changed to absolute addresses by CPU hardware prefixing (which is not apparent to the user). Absolute addressing is required in a MP because each of the plural CPUs has its own control-data area (called a PSA, prefix save area) which is located at real address zero. MP main storage has only one actual address of zero (called absolute address zero). Therefore, each CPU's real address zero is prefixed to a non-zero absolute address so that the real address of zero for each CPU is located at a different non-overlapping absolute address in the single range of absolute addresses in the MP machine. Normally the page at absolute address zero is not used as a PSA page. Thus, the CPU real addresses provided for accessing the PSA pages are different from their corresponding absolute addresses, but all other CPU real addresses provided for accessing main storage are the same as their corresponding absolute addresses.

Since there is only one set of absolute addresses in a MP between 0 and a maximum value (that can vary with each MP machine, for example 64 MB), only one copy of a UPS program can be located in the main storage.

Consequently in the prior art: (1) a UPS cannot directly execute on more than one CPU of a MP, because of a lack of programmed locks in its internal program routines to assure against failure of execution caused by plural CPU contention for its writable parts, (2) indirect execution of plural copies of a UPS on plural CPUs under VM (although operable) becomes economically impractical when the UPS has very high I/O activity because of the VM I/O burden, and (3) it is very expensive to rewrite complex UPS programs for plural CPU operation, which also would take a substantial amount of time and testing, although this can be done by those presently skilled in the MP programming arts.

As a result, the most efficient processing for such a UPS is limited to single CPU operation in a UP, even though faster and more reliable MPs are available. For the above reasons, existing ACP or TPF programs designed to execute on a single CPU cannot efficiently execute on plural CPUs in a MP system, so that the full MP processing rate is not available for ACP/TPF transactions. It is of course possible to utilize separate UP CPUs, but generally MP hardware provides a less expensive package for a given amount of processing power because of the use of some shared physical components.

THE INVENTION

Accordingly, objects of this invention are:

1. To enable plural CPUs in a MP system to each be able to efficiently run a uniprocessor programming system (UPS) (that is designed only to operate on a single CPU) having large amounts of I/O activity without changing the UPS programming system.

2. To allow the multiple copies of the UPS to access the same external data base DASD units through the same physical paths, where the UPS uses an external UPS to UPS communication means for record locking and synchronization, e.g. file control unit hardware lock containing an identifier for each record being locked which lock is set on at the time of a particular read request and is not set off until the same record is rewritten after the completion of an update of this record.

3. To enable plural CPUs in a MP system to be able to simultaneously and efficiently execute a UPS programming system having high I/O activity while maintaining MP integrity without changing the addresses in the UPS, and without putting MP integrity locks into the UPS.

4. To enable multiple copies of a UPS having high I/O activity to exist in MP main storage at different $2^n$ byte address locations for obtaining efficient simultaneous execution of the UPS copies on different CPUs in the MP system.

5. To provide a VM hypervisor type of control program which can operate on a MP to enable efficient, simultaneous, and independent execution on plural CPUs of respective copies of a UPS having high I/O activity which may be identically copied into plural areas of main storage for use by the respective CPUs.

6. To permit a MP system built in accordance with System/370 Extended Architecture (S/370XA) to execute a UPS program having multiple copies in main storage independently executing on plural CPUs in the MP, even though the UPS program has high I/O activity and was written without internal MP integrity locks for a single expanse of real addresses.

7. To enable a plurality of CPUs in a MP to independently and efficiently execute multiple MS copies of a UPS having high I/O activity, whereby each copy is executed on a respective CPU which has its architecture modified by an emulation instruction in a hypervisor program to emulate the type of CPU for which the UPS was written.

8. To prevent addressing interference between plural CPUs executing different copies of a UPS having high I/O activity in different areas in MS by: (a) having one CPU use real addressing to execute a UPS copy which directly maps its real addresses to the MS absolute addresses, and (b) by using a respective translation table for each other UPS copy for execution on another CPU to translate its UPS real addresses to the MS absolute addresses being accessd in its respective MS region, and (c) by using the addressing limit protection in an emulation state descriptor (SD) used by a start interpretive execution (SIE) instruction.

9. To enable I/O channel program real addresses in a UPS to be modified to absolute addresses at the time of a MS access request by the channel in a simple manner so that the I/O channel can properly address I/O areas in one of plural executing UPS copies in MS:
   (a) without interferring with the execution of another CPU using another copy of UPS in MS;
   (b) without software modification of the channel program addresses to reflect the real storage actually occupied; and
   (c) saving the copying of the channel program so the new addresses can be inserted without changing the channel program as seen by the UPS.

10. To enable efficient direct I/O channel handling by VM guests by having the VM guests use different copies of a UPS located at different $2^n$ byte addresses in MS, so that for each VM guest, the channel addresses are translated by the channel to MS absolute addresses by ORing to each channel address a zone factor derived from the $2^n$ byte address for locating that guest in MS. This channel translation does not involve any translation tables and can be implemented to avoid a MS access for each translation.

11. To prevent I/O operation interference on shared I/O devices by maintaining queues of requested operations on units busy servicing other UPS copies.

12. To issue a queued I/O operation for another UPS copy when a busy I/O unit completes its operation and instructing the I/O unit to interrupt the CPU dedicated to the UPS originally requesting the queued I/O operation.

13. To enable a UPS (coded to use S/370 I/O) to use the S/370XA I/O capabilities including an extended number of channels without having to modify the UPS.

This invention provides a unique multiprocessing environment for a uniprocessor system (UPS) program not written to run on a MP system. The invention provides a hypervisor type of control program (called a partitioned multiprocessing program, PMP) that enables the simultaneous execution in a MP by its plural CPUs of respective copies of a UPS in the MPs main storage (MS) with the capability of sharing a single I/O data base, e.g. on plural DASDs. PMP can provide any CPU with an affinity to a particular copy of UPS in MS. The plural CPUs executing the different copies of UPSs run independently of each other, but they may share I/O devices. PMP may run with a virtual machine (VM) type of job entry and task dispatching control programming system designed to operate on CPUs having 370-XA architecture, which was previously disclosed in the "IBM System/370 Extended Architecture Principles of Operation" (IBM Publication No. SA22-7085-0), in the "IBM Assists for MVS/XA" (IBM Publication No. SA22-7092-0), and in an article entitled "System/370 Extended Architecture: Design Considerations" in the May 1983 IBM Journal of Research and Development, Volume 27, Number 3 on pages 198 to 205 by A. Padegs. Program work is entered for execution by a respective UPS copy, and the work is controlled under VM/PMP as tasks of the respective UPS guest.

VM/PMP ensures MP integrity: (1) in its assignments of all tasks in the MP, and (2) in its assignment of each I/O device to any UPS operation. VM/PMP ensures integrity of the physical and logical I/O paths in the MP shared by the multiple UPS copies by maintaining I/O queues to hold operations issued by the UPSs to I/O units which are busy performing operations requested by another UPS copy. When any required I/O unit becomes free, PMP can issue the next pending operation from the queue.

Copies of UPS are program loaded into different regions in the MPs main storage (MS). Each region begins at a different MS location and comprises a contiguous byte area.

VM/PMP is initially program loaded into MS, preferably at the high address end of MS. Thereafter. copies of UPS can be loaded into MS from its low address end. A next copy can be loaded into MS at any time by a logon process.

The size of MS must equal or exceed the number of regions provided for the respective copies of UPS plus the VM/PMP and any other program areas. The UPS program may use an effective address size which only covers its region and the address size may be insufficient to address the absolute address range of MS. For example, UPS might contain 24 bit addresses, and MS absolute addresses may exceed 24 bit addressing, e.g. 26 bits. VM/PMP runs independently on each CPU in the MP to dispatch all work on each respective CPU, including the dispatching of both UPS and non-UPS work. Non-UPS work may be executed on a CPU if a UPS has not been assigned to it or the UPS assigned is not ready for execution. Non-UPS work may be VM work in which case VM/PMP passes control to the VM control program which then controls the CPU and I/O execution of VM work in the conventional VM manner. VM/PMP passes UPS work to PMP for execution. Under PMP control, CPUs may be dedicated solely to UPS work. VM work may be done on any CPU not dedicated solely to UPS work or on a CPU dedicated to VM work.

To allow I/O addresses in any UPS copy (i.e. I/O real addresses) to be handled in a simple manner that translates them to MS absolute addresses, each region begins at a boundary byte address which is an integral power of the radix 2, i.e. $2^n$. The first UPS region may begin at absolute address zero. The $2^n$ byte boundary enables the MS absolute address to be easily generated by logically ORing a representation of the $2^n$ boundary value and the UPS I/O address extended to 31 bits to form the translated 31 bit absolute address. More general I/O address translation means (more complex and costly) may be used to enable the region boundaries to be located more flexibly.

The lowest address in each region begins with a PSA page of the guest which may be structured in accordance with S/370 architecture and has the guest's real address zero. The contents of each guest's PSA page is simulated, i.e. entirely written in with programmed instructions rather than by CPU hardware actions.

However, each CPU in the system also has a hardware-controlled PSA page which receives hardware inputted contents, e.g. on hardware interrupts. Each CPU PSA page is preferably located in the PMP area of MS by the content of the CPU's prefix register. The new PSWs in the CPU PSA page point to routines in the PMP area for the handling of hardware interrupts.

VM/PMP acts as a host control program to enable the UPS copies to be executed as emulated guests on the respective CPUs by putting each CPU into emulation state for executing a UPS guest program. One method of having PMP put a CPU operating in 370-XA mode into emulation state is to have PMP execute a SIE (start interpretive execution) instruction, which causes the CPU to emulate the S/370 or S/360 architecture. The SIE instruction is disclosed and explained in U.S. Pat. No. 4,456,954, issued 6/26/84 by R. J. Bullions et al and assigned to the same assignee as the subject application. Each UPS copy in MS is handled as a separate guest which may be emulated on a different one of the CPUs of the MP by PMP executing a SIE instruction on each of such CPUs to put it into emulation state whenever the CPU is to execute a UPS guest.

The UPS guest emulation state on any CPU is temporarily ended whenever a hardware interruption occurs or the UPS guest executes either: (1) a UPS start I/O instruction, or (2) a UPS instruction (e.g. set system mask) that sets on an I/O enablement field in the guest's current program status word (PSW). When the emulation state is exited, CPU control is transferred from the UPS guest to the PMP host, and then PMP respectively: (1) starts the requested I/O device, (2) simulates the special instruction, e.g. SSM, causing interruption, or (3) handles the hardware interruption causing exit from emulation mode. Then PMP again puts the CPU back into the emulation state to continue execution by the UPS guest.

DESCRIPTION OF THE DETAILED EMBODIMENT

A. General Description

Figure 1:
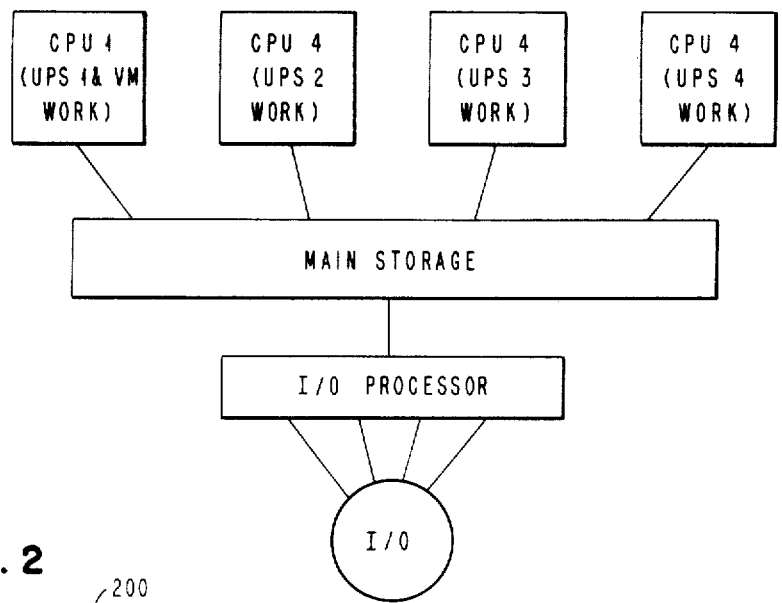
FIG. 1 illustrates a multiprocessing (MP) system in which the invention may be used.

FIG. 1 illustrates the hardware arrangement of a multiprocessor (MP) which may use the subject invention. The MP contains four CPUs each connected to a main storage in the conventional manner of tightly-coupled MP systems wherein main storage is shared by the CPUs connected to it. The main storage may have exclusive areas dedicated to particular CPUs but such exclusive areas are not part of main storage which is utilized by this invention. The shareable main storage utilized by the subject invention will allow any CPU to access any address location therein for a read or write operation.

An I/O processor provides all the channel functions of connecting any of the large number of I/O devices (called I/O) to main storage whereby any I/O device may, via a subchannel (SCH) provided by the I/O processor, transfer a record of data to or from any addressed area in main storage under the control of a channel program executed by the I/O processor and comprised of channel control words (CCWs). The MP system shown in FIG. 1 is presumed to be designed according to IBM System/370 Extended Architecture (370-XA) as defined in IBM publication number SA22-7085-0. Each CPU in the MP also contains the hardware and/or microcode providing the SIE (start Interpretive execution) instruction as defined in U.S. Pat. No. 4,456,954 of R. J. Bullions et al, entitled "Guest Hierarchical Support In a Computer System", filed 6/15/81, and assigned to the same assignee of the subject application.

The preferred embodiment of the virtual machine/partitioned multiprocessing program (VM/PMP) executes on each CPU one of the UPS copies in MS as a S/370 emulated guest by executing SIE instructions on each CPU on which a respective guest is being executed. The execution of each SIE instruction puts the CPU into an emulation state defined in a control block in MS called a state description (SD). The SIE instruction has one operand which addresses the SD. That is, the SD contains fields which define the hardware state to be emulated on the respective CPU so that the UPS program obtained from a particular UPS copy in MS can execute on the CPU in the emulated environment (e.g. S/360 or S/370) for which UPS was originally designed. The SD fields include: (1) an origin field containing the MS absolute address at which the UPS guest's real address zero is assigned, which located the guest's page zero, (2) an extent field containing the size in contiguous bytes of the MS area containing the region for the guest, (3) fields for the guest's current PSW (program status word), which contain the current PSWs for the guest to be used for guest interruptions, in which PSW exchanges occurring for that guest by a PMP sequence of programmed instructions, that for any class of guest interrupt will copy the current PSW field from the guest's SD into the old PSW field for the class in the guest's page zero and then copy the new PSW fields for each interruption class from the guest's page zero into that SD current PSW field to indicate the guest's new instruction address and new state, (4) save areas for the guest's 16 general registers (GRs) and 16 control registers (CRs), and (5) miscellaneous other fields for other guest states.

Figure 3:
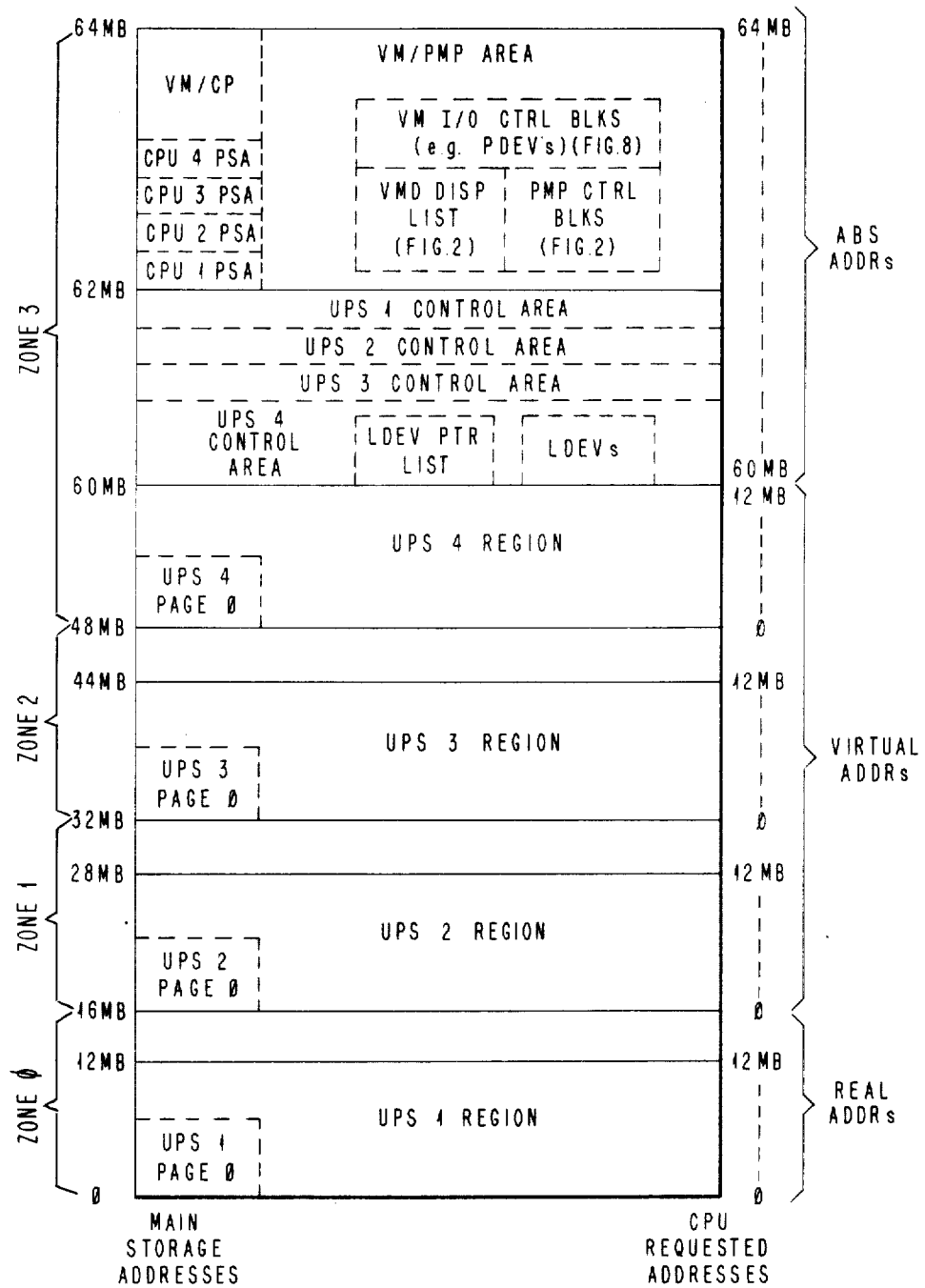
FIG. 3 illustrates an addressing map of main storage containing four guest regions, a VM/PMP area, their absolute address ranges and their real address and virtual address ranges used by the UPS guests.

Initially, the VM/PMP programs are loaded into MS in its highest absolute address range, which in the memory map of FIG. 3 is the range from 60 MB to 64 MB. The lower part of MS from 0 to 60 MB is then available for receiving copies of UPS.

The loaded VM/PMP area contains a program save area (PSA) for each CPU in the MP system which may be used in the future for UPS operation. FIG. 3 shows PSA areas for four CPUs. When any CPU is initialized for UPS operations, its PSA in MS will be located by an absolute address initialized into a prefix register in the respective CPU.

The loaded VM/PMP area also contains a VM control program (VM/CP) which will receive jobs and dispatch tasks in a manner similar to the operation of conventional VM/CP programs.

Figure 2:
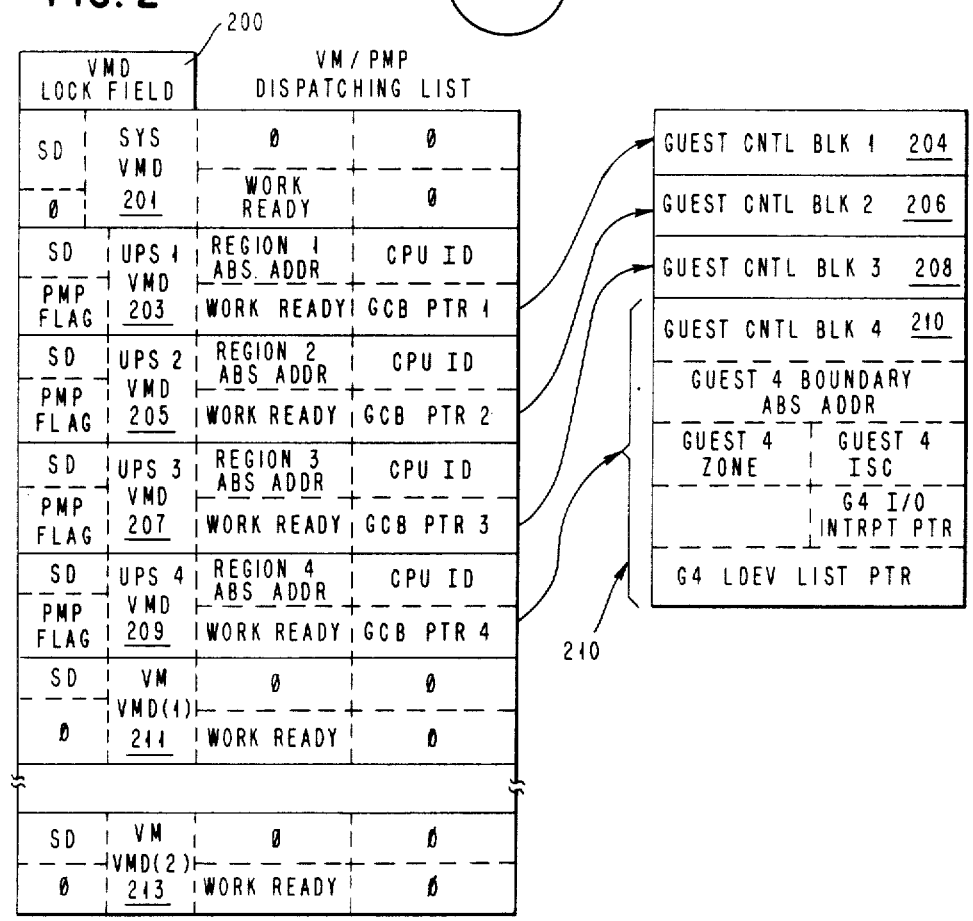
FIG. 2 represents a VM/PMP dispatching list and its PMP control blocks used by a supervisory partitioned multiprocessing (PMP) program in a preferred embodiment of this invention.

VMD (VM definition) blocks and PMP control blocks are also included in the VM/PMP area and are shown in more detail in FIG. 2. A VMD block is provided for each user of the system when the user enters the system, e.g. logs on the system. The example in FIG. 2 shows a system VMD201, a UPS VMD for each UPS which is loaded into the system (e.g. 203, 205, 207 and 209), and a VM VMD for each conventional type of VM user (e.g. 211 through 213). Also a novel PMP block (e.g. 204, 206, 208 and 210) is initially provided for each UPS which may be loaded in the future into the system.

Figure 8:
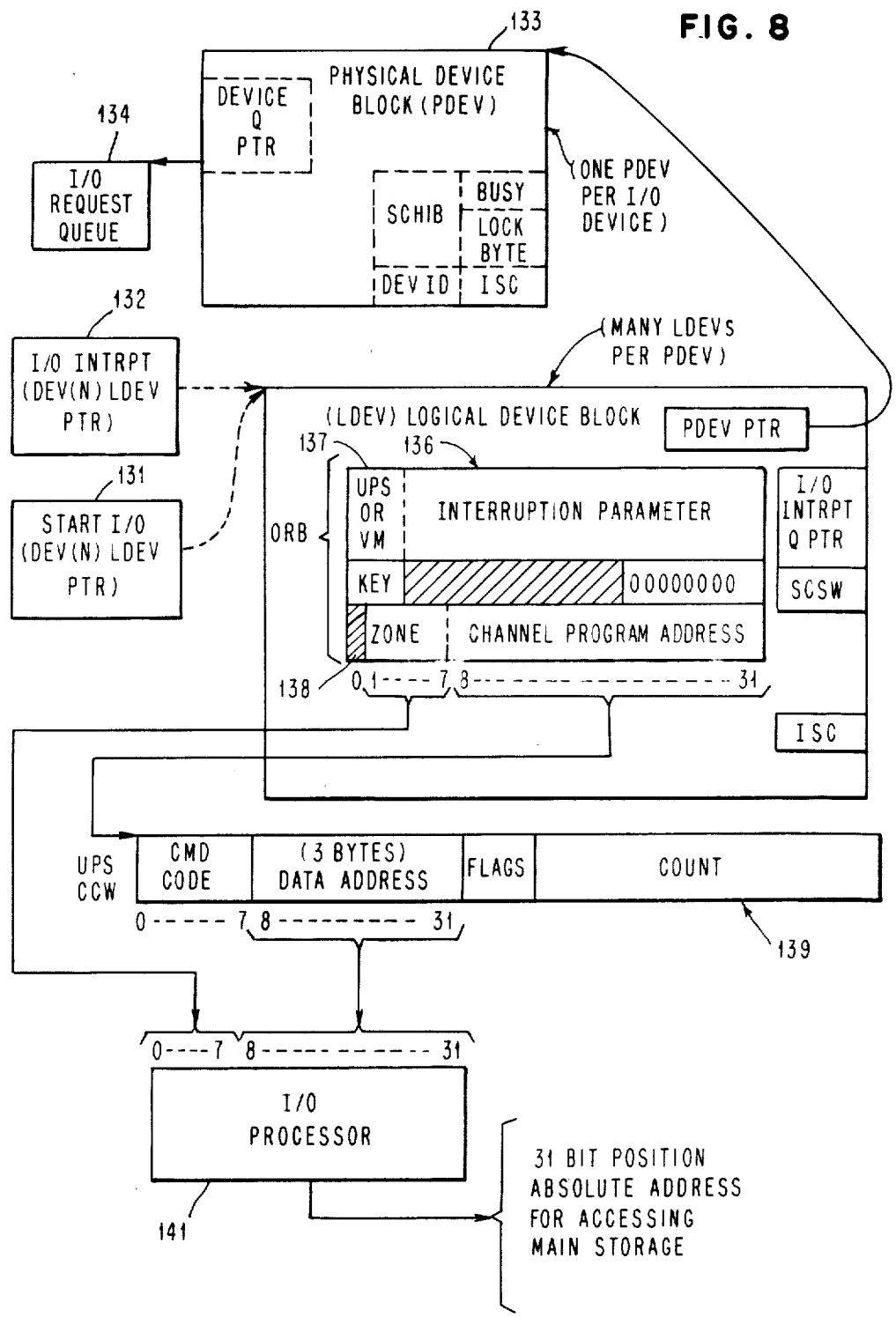
FIG. 8 illustrates a typical I/O subchannel, its technique for translating the addresses of any UPS guest channel program and the logical connection to the UPS guest subchannel to a CPU via an ISC field.

PMP I/O control blocks (e.g. physical device blocks, PDEVs) are also initialized into the VM/PMP area, one PDEV per physical I/O device in the system. This embodiment also provides a novel UPS control area for each UPS which can be loaded into the system, which is shown in FIG. 3 as a UPS1 control area through a UPS4 control area; each UPS control area contains the logical device (LDEV) blocks and a list of LDEV pointers to the LDEVs which represent the I/O devices useable by the particular UPS which it is loaded into the system. There may be plural LDEVs (that is, one LDEV per UPS) for the single PDEV representing a device. FIG. 8 shows a PDEV and LDEV and their interconnection in a system.

Figure 9:
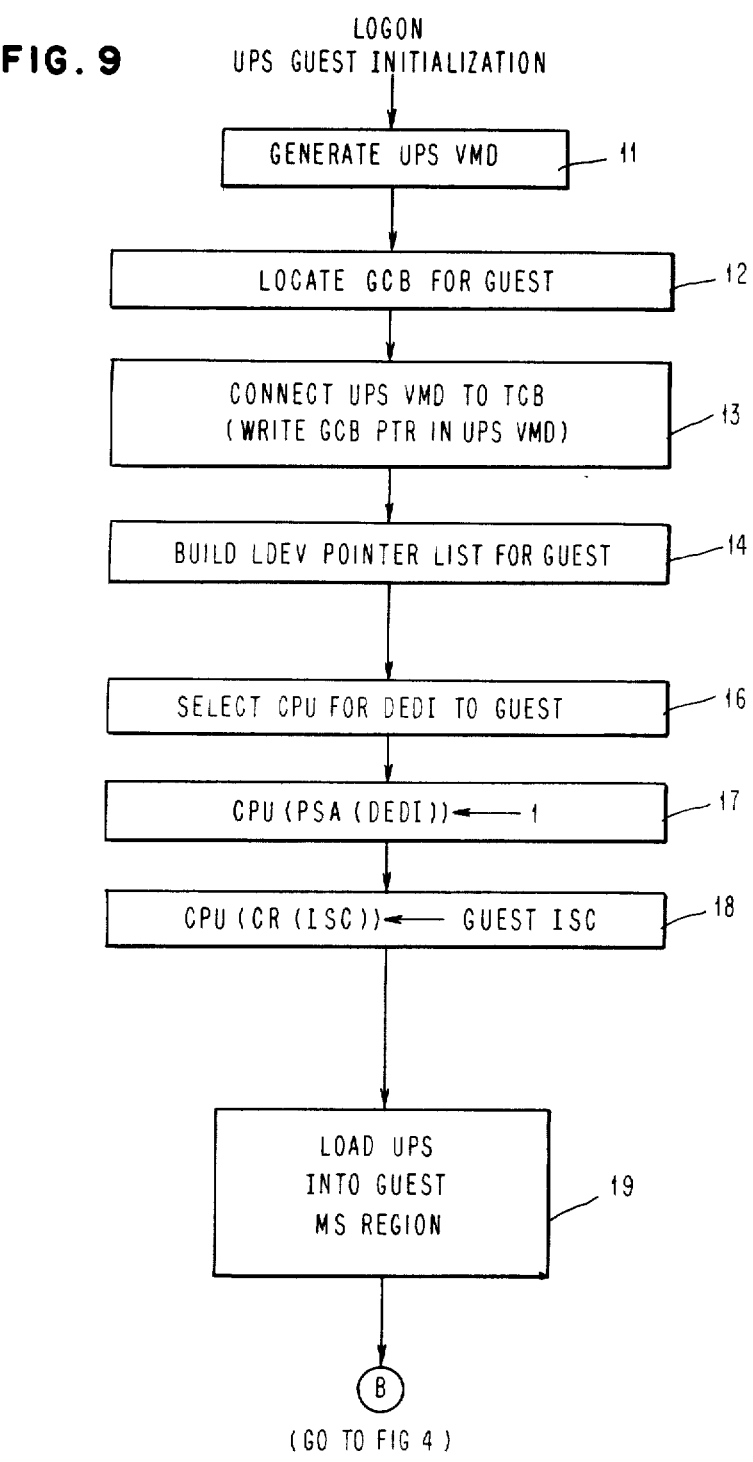
FIG. 9 illustrates the methodology of a system initialization program for initiating operation of the described embodiment.

After initialization of the VM/PMP programming, each UPS guest may be loaded into MS by a logon procedure, such as shown in FIG. 9. This procedure will load a first UPS copy into a first MS zone, preferably zone 0 which has its origin at absolute address zero of MS, and assign the UPS to a CPU. All addresses requested by the CPU executing the guest in zone 0 can directly use the absolute addresses in zone 0 as the guest's real addresses. This direct mapping of user program addresses to main store addresses can only be done by the UPS guest using zone 0 because it begins at absolute address zero, in contrast to other UPS guests in other MS zones which contain the same set of real addresses which however cannot directly map to MS absolute addresses. This problem is solved by handling the real addresses of each second and subsequent guest as virtual addresses requiring translation tables to translate each guest's real addresses to required MS absolute addresses.

The second and each subsequent UPS guest has a UPS copy loaded into each next zone in MS beginning at the next $2^n$ byte boundary address. The value of n is determined by the number of bits in the effective addresses contained in the UPS program, which is basically determined by the computer architecture on which the UPS program was designed to run. For example, if UPS was designed to run on S/360 or S/370 architecture, n is 24 because there are 24 bit positions in each effective address. Since $2^{24}$ is 16 MB, each S/360 or S/370 UPS can address up to 16 MB of MS. To accommodate these UPS programs, MS is logically divided into 16 MB increments, called zones. Zone 0 contains the first 16 MB of MS absolute addresses, zone 1 contains the second 16 MB of absolute addresses, etc. Each UPS program occupies a region entirely within one zone. Each UPS does not need to actually occupy its entire zone, but each UPS copy should nevertheless start at the beginning boundary of its zone. The UPS examples in FIG. 3 assume each UPS occupies a 12 MB region of real addresses in each 16 MB zone.

Thus, the second and each subsequent guest has its UPS real addresses handled by the VM/PMP control program as virtual addresses, whereby the second and any subsequent guest is respectively assigned a segment table and a set of page tables by the PMP program in the respective UPS control area.

The second guest and each subsequent guest (if any) is preferably run as a V=F (Virtual equal fixed) type of guest. A V=F guest entirely fits into its MS region. This allows the guest's page table entries to be assigned the absolute addresses of page frames in the guest's region which are to contain all pages in the UPS. Therefore a V=F guest does not need to use page swapping with auxiliary storage during normal operation after it has been loaded into MS.

The UPS is loaded by the CPU making requests using a real address for each page in the UPS. This causes a page fault for each page resulting in the loading of each UPS page into that region. By having the pages of the second and any subsequent guest located in page frames which are in fixed locations in MS, any TLB (translation lookaside buffer) in the CPU will be loaded by address translations caused by page faults. Most of these translations stored in the TLB will later to be required by that UPS during its normal execution. Dedicating a CPU to a UPS assures that the dedicated CPU's TLB contents will not be changed by another program using that CPU except for VM/PMP acting on behalf of that UPS, so that its TLB will continuously retain most of its initialized translations, and TLB replacements will infrequently occur to increase the UPS performance on each dedicated CPU in a MP. A non-dedicated CPU will therefore suffer from a higher frequency of TLB entry replacements.

VM/PMP also includes programming for starting an I/O channel program for any guest's I/O devices, for the sharing of I/O devices among UPS guests, and for the handling of I/O interruptions for UPS guests operating on the plural CPUs.

PMP executes each UPS guest under a PMP issued SIE instruction. PMP terminates guest execution under SIE (called a SIE exit or a SIE intercept): (1) whenever the guest executes a start I/O instruction (e.g. SIO or SIOF), or (2) whenever SIE execution detects that the I/O enablement bit (e.g. PSW bit 6) is set on in the guest's current PSW in the guest SD. Upon a SIE intercept due to a guest SIO or SIOF, PMP executes a routine: (1) to issue a 370-XA start subchannel instruction to activate the I/O channel program for the requested device if it is not busy, or (2) to put the I/O request on an I/O request queue for the device if the device is busy.

Upon a SIE intercept due to I/O enablement, PMP handles the oldest interrupt in the guest's interruption queue.

In order to find an entry in the I/O interruption queue for a guest, VM/PMP accesses the VMD for the guest and obtains a pointer to the guest's guest control block (GCB), and accesses the I/O interruption queue pointer therein to find if any unserviced interruptions exist. If the pointer is not zero, then there are unserviced interruptions, and the I/O interruption is simulated by VM/PMP. The I/O interrupt queue is composed of a chain of LDEVs containing unserviced interruption information received while the UPS is prevented from receiving I/O interruptions.

When a guest I/O interruption occurs while the CPU is not executing UPS, VM/PMP similarly services the interruption, or queues it onto the guest device's interruption queue if the guest is disabled for I/O interruptions.

When a CPU is dedicated to a UPS guest, the CPUs control register is set to allow only I/O interrupts with a specific ISC to interrupt this CPU. Therefore whenever an I/O interruption occurs for a UPS device, PMP will be executing on the CPU dedicated to that UPS guest.

The hardware provides two interruption parameters for every I/O interruption. One is the subchannel number causing the interruption and the second is a software parameter set by software on every MSCH and SSCH instruction. For a PMP device, the software parameter is always the address of the LDEV associated with the current operation.

The high order bit of the LDEV address (bit 0) is always set to a 1. This flag is used by PMP to differentiate its devices from VM controlled devices. From the LDEV, the PDEV and the I/O interruption queue pointers can be found.

When a guest program issues a SIO or SIOF instruction, SIE execution is intercepted, and PMP starts an I/O channel program using special facilities provided by this invention. In FIG. 2, VM/PMP accesses the VMD for the guest and obtains a pointer to the UPS guest's guest control block (GCB), and then VM/PMP accesses the LDEV pointer list pointer. Then VM/PMP goes to the LDEV pointer list in the respective UPS control area, and uses the I/O address provided by the start I/O instruction to index to the required LDEV pointer in the list. This LDEV pointer is then used to access the required LDEV, which contains a S/370XA defined ORB (operation request block). The ORB contains the channel program address (modulo 16MB) and a zone field which is copied from a guest zone field in the PMP control block initially accessed in this start I/O procedure. (The respective guest zone field was initialized with bits 1-7 of the origin absolute address of the respective guest's zone when the UPS guest was logged on.) Then the found ORB is passed to the I/O processor which logically ORs the zone field to the high-order end (leftmost end) of the 31 bit extended form of each MS address derived from a CCW (channel command word) or IDAW (indirect data address word) in a channel program to generate the required MS absolute addresses. The result of this procedure is that the 24 bit position real addresses provided by the UPS guest from the respective copy of UPS running in any region are translated by a simple hardware I/O address translator in the I/O processor into 31 bit absolute addresses required to access MS in the zone occupied by the UPS. This simple translator depends on each UPS region having its origin on a zone initial boundary address which is a multiple of $2^{24}$. (This I/O processor address translation avoids having the VM/PMP program do CCW address translation by programming, which would greatly slow down the rate at which I/O operations could be handled by V=F guests.) For any UPS having a very high I/O rate (such as ACP/TPF), the added system efficiency provided by using address translation may greatly enhance MP system performance for this type of UPS to allow each V=F UPS guest to run at the same rate attainable by the UPS on a uniprocessor having the same CPU instruction rate.)

The simple automatic hardware I/O address translation is obtained by the CPU initially setting an address zone value into the ORB for the guest I/O device. The channel processor generates 31-bit absolute addresses to access CCWs and data as follows. For all I/O channel programs, the first CCW is addressed using the 31-bit channel program address field of the ORB. When the format (F) bit in the ORB specifies format 0 (S/370 compatible) CCWs, the 370-XA channel subsystem operation is modified by this invention such that bits 1-7 of the channel program address field of the ORB (called the zone in this embodiment) is logically ORed to bits 1-7 of the 31-bit absolute MS address derived from the 24-bit data address field of the CCW or a 31-bit IDAW (if CCW indirect data addressing is indicated in the CCW). When the 24-bit data address field of the CCW is used, the 24-bit value is first extended to 31 bits with zeroes in the leftmost 7 bits. The above procedure is carried out each time a non-contiguous CCW, IDAW, or data access is required. Contiguous accesses only require incrementing an address that was previously generated by the procedure disclosed above.

It is important to note that this embodiment requires that the 7-bit zone value from the ORB be logically ORed with the leftmost 7 bits of the 31-bit IDAW or the 31-bit value created by extending the contents of the 24-bit CCW data address field. The reason for logically ORing the zone value to a 31-bit value, rather than simply concatenating the zone value to the 24 bit CCW data address field contents or the rightmost 24 bits of an IDAW (whichever is applicable for the data address being formed), is to provide compatibility with programs designed to run under the standard 370-XA architecture. In the standard 370-XA architecture (and also the S/370 architecture extensions provided by the IBM 3033 Extensions Feature) IDAWs may contain up to 31 bits of address. 31-bit IDAWs were introduced so that programs that have not been converted to use the 31-bit address CCW format (format 1) can still use I/O data areas located above the first 16 MB in MS. In fact, the MVS/XA control program makes use of 31-bit IDAWs for this purpose. The logical ORing of the zone bits as disclosed above provides for compatibility because, in the standard 370-XA architecture, bits 1-7 of the channel program address field of the ORB (the zone bits in this preferred embodiment) are required to contain zeroes when format 0 (24-bit address) CCWs are specified in the ORB. When these bits are logically ORed to the 31-bit value from an IDAW (which may contain non-zero values in the 7 leftmost bit positions, the result of the logical ORing leaves the original 31-bit address undisturbed. Those skilled in the art can readily appreciate that concatenating the zone and a 24-bit address to form a 31-bit address does not provide for the compatibility described above. It is an important aspect of this invention that a computer system which incorporates it can execute the programs described in this embodiment as well as programs designed to execute under the standard 370-XA architecture without further modification. If such compatibility is not important, this invention also includes obtaining the required address translation by concatenating the zone field to the left end of each UPS 24-bit channel address.

I/O devices in a PMP environment may be classified as follows: (1) VM/CP assigned devices, and (2) PMP shared devices (which are not assigned to VM/CP).

Initially, all shared devices are assigned to PMP. All other devices are assigned to the VM/CP control program through the normal VM system generation (sysgen) process. These devices may be used by VM itself, or they may be reassigned to any UPS guest by using the VM attach macroinstruction to connect any I/O device to a designated UPS guest. When such devices are attached to a UPS guest, programming control over the device is passed to PMP, and PMP does special processing using 370-XA I/O control blocks to control its I/O.

Also, the PMP program provides a device sharing mechanism to allow multiple UPS guests in the same MP to access the same physical devices. Each UPS shared device has a valid logical subchannel configured for each guest sharing the device by having an LDEV for the same physical device put into the UPS control area for each sharing guest. Hence any UPS device may be shared between plural UPS guests; but while a device is busy, it may not be accessed by any other guest. Hence, device sharing is done by having a corresponding logical device control block (LDEV) for each sharing guest initialized into the system. For shared devices, there will be plural LDEVs for the single PDEV representing the device. LDEVs are put into the VM/PMP main storage area.

A new UPS guest can be initialized into a system at any time if both a CPU and a MS zone are available for use by the new UPS guest. VM/PMP can change the device shareability by inserting an LDEV for an existing UPS device into the UPS control area for a UPS guest being logged on.

Typically, tape, unit-record, console and communication devices are not shared, assigned to VM, and dedicated to respective guests. DASD devices will usually be shared between UPS guests.

In this manner, the dedication of a CPU to execute only one UPS guest and no other work reduces interprocessor interference and also reduces the software execution path length in the supporting PMP programming by eliminating the need for the PMP software to provide address translations. VM/PMP dedicates a CPU by setting a CPU ID field in the VMD of a user, which dedicates the CPU to only execute the work of that VMD. Other initialization activities involve: (1) setting the prefix register of each CPU being dedicated with the absolute address of the CPU PSA in the PMP area of MS; (2) setting a CPU dedication field in the CPU's PSA to the address of the UPS guest; (3) setting a different I/O interruption subclass code (ISC) enablement bit position in control register 6 of each respective CPU which is to do UPS work, (4) assigning the same ISC value to each I/O subchannel for each device assigned to a respective UPS guest, and (5) providing a different set of translation tables for each translatable guest (except for the guest assigned to MS zone 0). The same CPU and I/O ISC setting causes an affinity between a CPU and a subset of I/O devices used by a guest having the same ISC value. Any UPS guest can be provided use of any non-busy I/O device (assigned to it by an LDEV) by merely changing the ISC value in the PDEV for that device to the ISC value initially assigned to the requesting UPS guest in the guest's LDEV for that device. Then that CPU can start the device, and receive all interrupts from that device.

In this manner, the VM/PMP program can provide for a UPS guest a dedicated CPU environment, fast path I/O support for simulating S/370 I/O instructions in a 370-XA I/O environment, and shareable I/O device programming support.

B. Detailed Description

An example of the MP system in FIG. 1 loaded with four copies of a uniprocessor system (UPS) is illustrated by the main storage map shown in FIG. 3 in which main storage (MS) contains 64 megabytes (MB) of shareable storage accessible by any of the CPUs 1, 2, 3 or 4 shown in FIG. 1. MS is logically divided into four 16 MB zones numbered 0-3 in FIG. 1. Thus, in FIG. 3 a first copy of UPS is written into the UPS1 region in zone 0, a second copy of UPS is written into the UPS2 region in zone 1, a third copy of UPS is written into the UPS3 region in zone 2, and the fourth copy of UPS is written into the UPS4 region in zone 3. Each of these regions begins at a zone boundary absolute address which is a multiple of 16MB except for UPS1 which begins at the boundary absolute address zero. Accordingly, the beginning boundary addresses for each of the UPS regions is a power of the radix 2 (i.e. $2^{24}$ power) Or put another way, all of the 31-bit absolute addresses used to access MS on behalf of a particular UPS contain the zone number in which it resides in the zone bit positions 1-7 of the address.

In fact each UPS does not require 16MB, but it only requires 12 MB. Hence, the UPS4 which begins at absolute address 48 MB, and it does not require space beyond 60 MB. Accordingly, at 60MB a VM/PMP area is provided into which the VM/PMP program is loaded, which occupies 4 MB, up to absolute address 64 MB. VM/PMP includes PMP routines and VM/CP. The VM/CP (control program) is like the conventional VM/CP program but supports the SIE instruction in the manner defined in U.S. Pat. No. 4,456,954 previously cited. The execution of the different copies of the UPS in main storage will be dedicated to different CPUs in the MP. Thus, UPS2, 3 and 4 will have their execution respectively dedicated to CPUs 2, 3 and 4. Although UPS1 will execute only on CPU1, CPU1 is not a dedicated CPU becaust it also executes VM work. However, a dedicated CPU also executes VM/PMP for the UPS guest dedicated to that CPU.

Each UPS is presumed to be designed to the IBM System/370 Architecture as defined by any level of the IBM publication GA22-7000, wherein the UPS is not designed to support more than 16 MB of real storage, and each UPS is presumed not to have been designed with MP program locks or other means to assure MP integrity if a single copy were executed on plural CPUs. Each UPS is also presumed to have been designed with an expanse of real addresses from 0 to 12 megabytes, which is the region size.

The VM/CP program may be based on the IBM VM/System Product (SP) having program number 5664-167 which has been commercially available for several years on IBM systems. Before the VM/PMP programs are loaded into main storage, they are link edited to cause all of their contained addresses to have absolute addresses in the 60 to 64 MB range.

After the VM/PMP program is loaded into the VM/PMP area in main storage, it contains code for loading and initializing the UPS copies into the respective regions, which includes the process shown in FIG. 9. VM/PMP also contains the program save areas (PSA) for the respective CPUs 1, 2, 3 and 4. Each PSA area may comprise a page frame of data having fixed address assignments for controlling the operation of a respective CPU, having address assignments as defined in chapters 3 and 4 of the IBM System/370 Extended Architecture Principles of Operation (IBM publication number SA22-7085-0) published March 1983. The VM/PMP area in FIG. 3 also contains the dispatching list and control blocks shown in detail in FIG. 2. The dispatching list contains a plurality of control blocks (VMDs) which are essentially the same as the VMD control blocks conventionally used in the VM/SP programs. However, the VMD blocks provided for the VM/PMP program has additional specially tailored fields for adaption to this invention, such as a PMP flag field and a UPS pointer field.

A VMD is generated for a user by VM/PMP when the user logs on the system. However, the PMP guest control blocks (GCBs) shown in FIG. 2 are initially provided in the VM/PMP program with a GCB being generated for each available MS zone which could receive a UPS copy at some future time. The contents of each GCB is also initialized when VM/PMP is initialized, including the zone boundary absolute address, a guest zone value, ISC value, guest I/O interruption pointer, and a LDEV list pointer.

In the example of FIG. 2, there is shown a system VMD 201, four UPS VMD's 203, 205, 207 and 209 and a plurality of VM VMD's from 211 through 213. The system VMD 201 and VM VMD's 211 through 213 are provided for each task to be run in the conventional VM manner that VM tasks are presently run under VM systems.

A VMD lock field 200 is provided which is inspected by any CPU successfully executing a compare and swap (CS or CDS) instruction before entering the dispatching list in order to assure that not more than one CPU may enter the dispatching list at any one time.

Every VMD contains a work ready field, a CPU ID field, and a state description (SD) field. Each SD is a large area with many fields providing a system description for the CPU executing the SIE instruction to cause the CPU to emulate another architecture (e.g. S/360 or S/370) which is used by the guest represented by the respective VMD. The SD content is previously defined herein. The CPU ID field is available to contain the identifier of a dedicated CPU on which the work of this VMD is to execute. When the CPU ID field is set to zero, the work of the VMD may execute on any CPU. The work ready field indicates whether there are any tasks ready to execute for the respective VMD, and the tasks of non-UPS VMDs are contained in other fields (not shown) in the non-UPS VMDs.

Each UPS VMD contains a PMP flag field which may be a single bit which is set on to identify that a particular VMD is a UPS type of VMD which requires the UPS processing provided in the PMP program.

Each UPS VMD additionally contains a UPS pointer (i.e. address) to a respective GCB. Thus, UPS1 VMD203 contains a pointer to GCB 204; and in a like manner, each of the other UPS VMDs 205, 207 and 209 have a GCB pointer to a respective GCB 206, 208 and 210 for respective UPS guests.

The respective UPS guest GCBs 204, 206, 208 and 210 are structured identically to each other in which control block 210 is shown in detail to contain a guest 4 boundary absolute address which contains the absolute address of the initial boundary of the region for UPS4 in main storage. The guest 4 zone field is next to a bit 138 which is set to 0, and the seven zone bits are the leftmost seven bits of a 31 bit absolute address representing the initial boundary, which for guest 4 is 48 MB. GCB 210 also has a guest 4 ISC field contains an I/O interruption subclass code (ISC) assigned to the respective guest. GCB 210 also contains a guest 4 I/O interruption pointer for locating the beginning of the I/O interruption queue for this guest, and a LDEV list 4 pointer which locates the LDEV pointer list in the guest's UPS control area. The LDEV pointer list contains address entries for locating the LDEVs for this guest's assigned I/O devices. The same LDEV may be used by a plurality of guests to share the same physical device.

In the example of this embodiment, a UPS program (which may be on a magnetic tape) may be copied four times into the respective four regions for UPS1, 2, 3 and 4 in FIG. 3 by the logon procedure in FIG. 9. Each time the UPS program is copied, it will provide the same set of 24-bit real addresses in each respective region as exists on the magnetic tape from which it was copied. These real addresses will range from 0 through 12 MB in each region from the beginning boundary of the respective region. The remaining four megabytes at the end of each zone region are not used by the respective UPS and are available for some other program, such as use by the VM program for assignment to its conventional VM users (i.e. VM guests), and may be storage allocated by the VM control program for VM guests.

Each UPS region begins with a UPS page zero, which is a PSA area simulated for an emulated CPU which is to execute the UPS program in the respective region as an emulated guest under the PMP program which is considered the host system. The UPS page 0 is designed according to the computer architecture for the respective emulated CPU, e.g. S/370. In the example of this embodiment, each of the UPS guests operate under the S/370 architecture under a host PMP program operating under the 370-XA architecture.

FIG. 9 illustrates a logon procedure which enables the initialization of a UPS guest into the system. This logon of a new guest may be done at any time as long as the system has a GCB and the memory space available to accommodate another UPS guest. Step 11 has VM/PMP generate the particular UPS VMD for the current guest G as a next VMD on the VMD dispatching list. Then, step 12 locates the GCB for the UPS VMD of this guest in the VM/PMP region of MS. Then step 13 connects this GCB to the newly generated VMD by putting a GCB pointer in the VMD that locates this GCB.

Then step 14 builds the LDEV pointer list for the guest UPS control area.

Next step 16 selects any available CPU for dedication to guest G. Step 17 finds the PSA for this CPU in the VM/PMP area, locates the dedication field in the PSA, and sets it to an on state (e.g. 1 state). Then step 18 loads a control register (CR) in this CPU with the ISC value assigned to the guest in the guest's GCB. Next step 19 loads the copy of the UPS at the MS absolute address in the guest's GCB. If any of the steps in FIG. 9 should fail, the logon of the new guest cannot be done.

Figure 4:
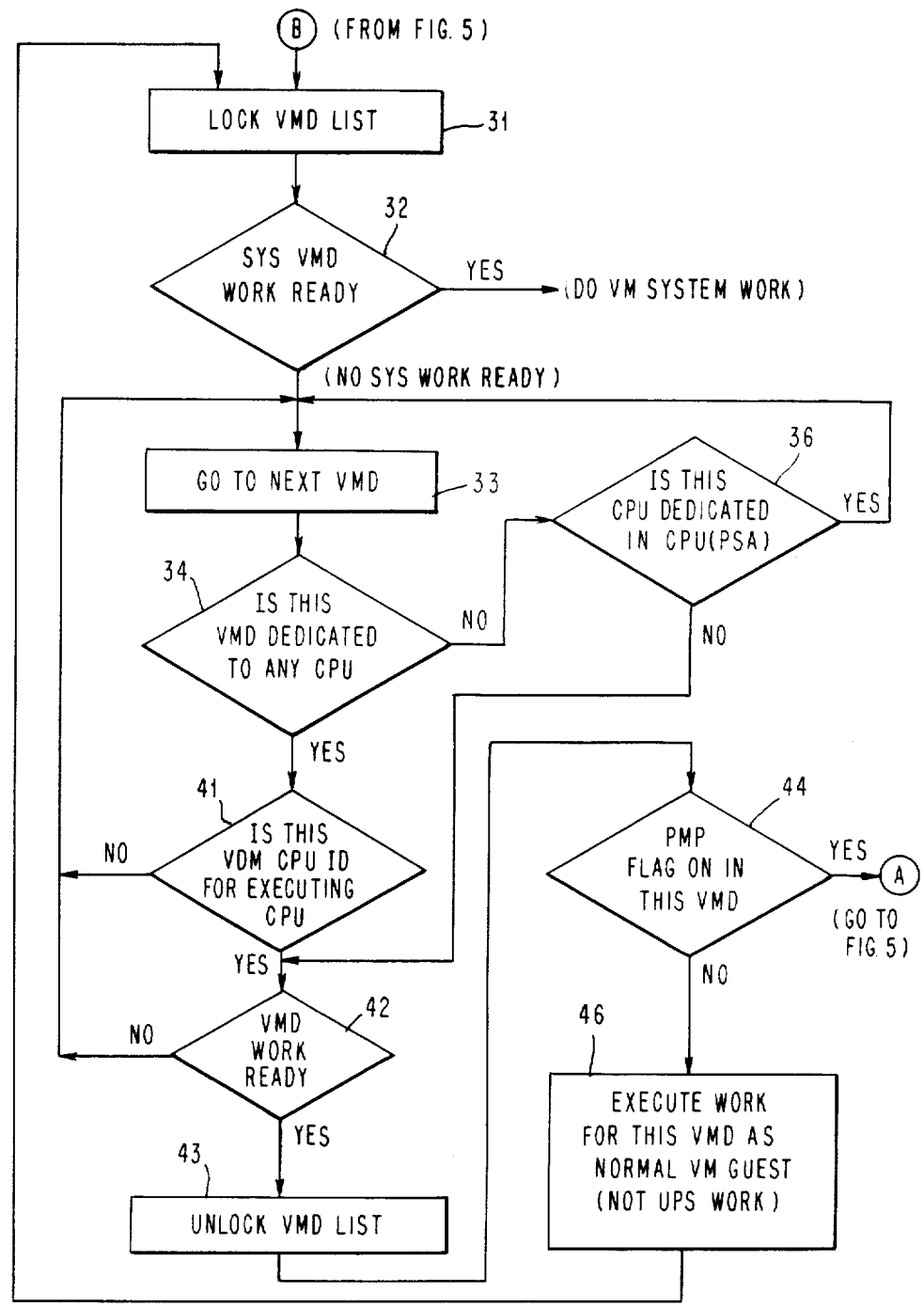
FIG. 4 illustrates the VM/PMP control program dispatcher routine which is executed in parallel by all CPUs in the MP using the preferred embodiment.

FIG. 4 illustrates a flow diagram of the dispatcher routine in the VM/PMP control program. The dispatcher routine is available simultaneously to execute on all CPUs in the MP. Whenever any of the CPUs needs work to execute, it enters step 31 to access the dispatching list. To do this, a CPU must first set the VMD lock field 200 in FIG. 2. Only then is any CPU permitted to access the VMD dispatch list. To set the lock, a CPU must successfully execute an instruction such as compare and swap in the conventional manner. When the lock field is set by a CPU, only that CPU may access the VMDs in the list by a convention among the CPUs in the system. Then the dispatching program for that CPU goes to step 32 to examine the first VMD block on the list (which is the system VMD block 201) to determine if any bit in its work ready field is on to indicate whether there is any type of general system work ready to be executed. If there is, the work is executed in the manner conventionally done by a VM/SP program. The work ready field is presumed to be that found in the conventional VMD used in VM/SP.

After any VM system work is completed, or if all bits in the work ready field are off for system VMD 201, step 33 is entered to go to the next VMD (which is shown as the first UPS VMD to be examined which is the UPS1 VMD 203). Then step 34 examines the CPU ID field to determine if this VMD is dedicated to a particular CPU, so that all of its work must be done only on the CPU having the ID in that VMD. If the CPU ID field is zero indicating this VMD has no dedicated CPU, then test 36 is entered to determine if the CPU executing this dispatcher program is a non-dedicated CPU by examining a dedication field in this CPU's PSA in the VM/PMP area. If the dedication field is on for this CPU, but is not on for this VMD, then the work of this VMD cannot be executed on this CPU (i.e. this CPU is dedicated to another VMD), and a branch is taken back to step 33 to go to the next VMD (e.g. UPS VMD 205).

On the other hand, if step 36 finds the dedication field in the CPU PSA is off, then this non-dedicated VMD may execute work on this non-dedicated CPU. Then step 42 is entered to determine if any bit in the work ready field is on for this VMD. If no work is ready, step 33 is reentered. But if work is ready, the VMD dispatching list is unlocked by step 43 resetting lock field 200 in FIG. 2, so that the dispatching list may be examined by another CPU. Then step 44 examines the PMP flag in this VMD to determine if it represents UPS work or VM work. If on, an exit A is taken to FIG. 5 to execute the UPS work on the non-dedicated CPU. If the PMP flag is off, step 47 is entered to execute the work for this VMD as a normal VM guest on the non-dedicated CPU.

Figure 5:
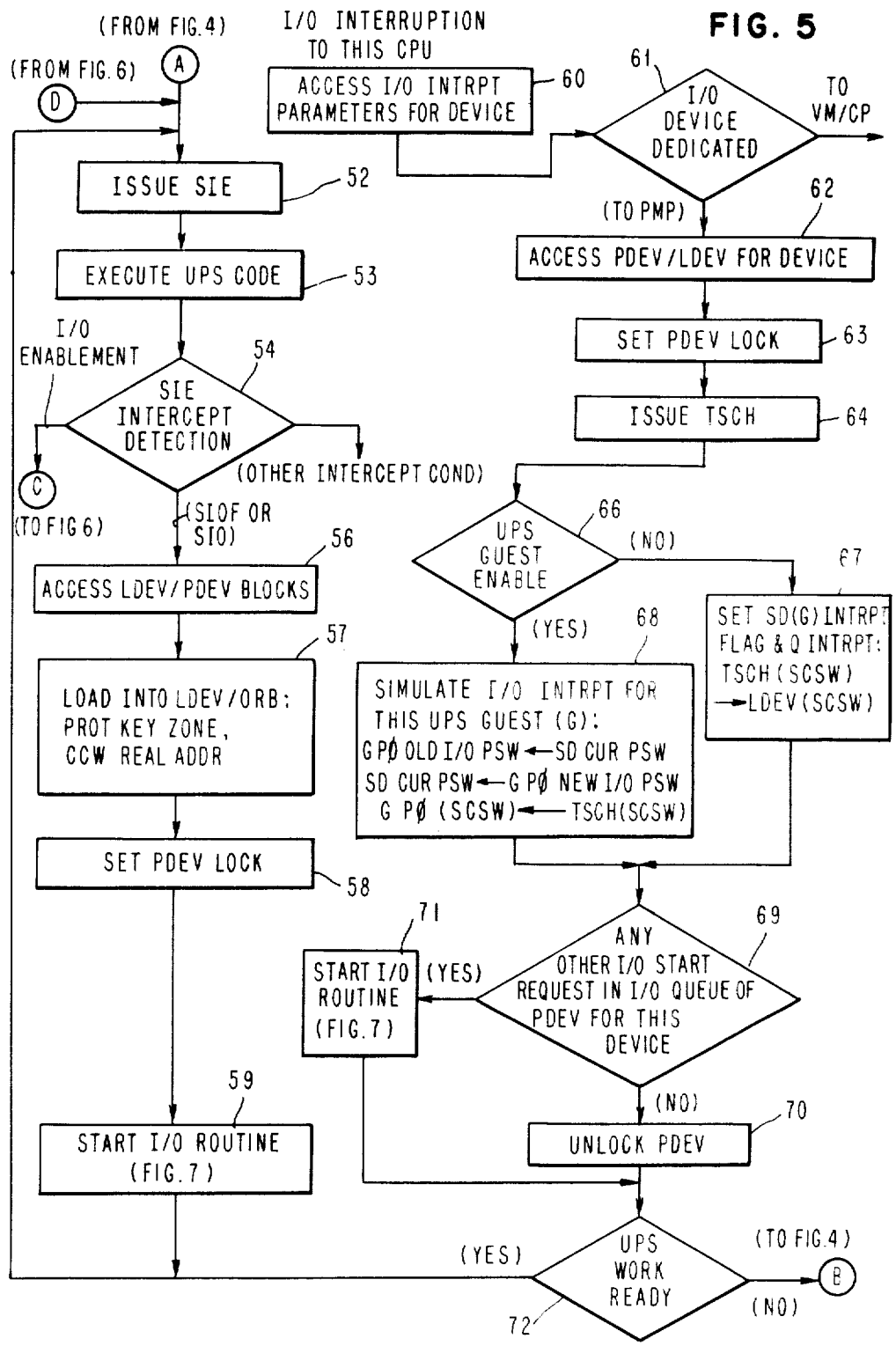
FIG. 5 is a flow diagram of the partitioned multiprocessor program (PMP) in the preferred embodiment.

However, if step 34 finds the VMD's CPU ID field specifies a dedicated CPU, the yes exit is taken to step 41 which compares the CPU ID field in the VMD to the CPU ID in the dedication field in the executing CPU's PSA. If they do not compare equal, this CPU is not dedicated to this VMD and the no exit is taken back to step 33 to go to the next VMD. On the other hand, if they compare equal, this CPU is dedicated to this VMD and the yes exit is taken to step 42 to examine the work ready field in the VMD. If step 42 finds no work is ready for this VMD, then the no exit is taken from step 42 back to step 33. But if the work ready field is on, step 43 is entered to unlock the VMD dispatch list, so that it can then be examined by another CPU in the MP. Then, step 44 is entered to test the state of the PMP bit in this VMD. If it is on, UPS work is indicated for this VMD, and exit A to FIG. 5 is taken to do the UPS work. If off, no UPS work exists but VM work exists and the no exit is taken from step 44 to step 47, and step 47 does the work as normal VM work on this CPU.

When the VM or UPS work is completed on a CPU, step 33 again is entered from step 47 or from exit B in FIG. 5 and the process in FIG. 4 is repeated.

When PMP work exists, FIG. 5 is entered from exit A in FIG. 4, and the PMP program uses step 52 to issue the SIE instruction to put the CPU into an emulation state to emulate the architecture required for the respective CPU to execute the UPS program, which then executes the UPS code using step 53.

The UPS code execution temporarily ends whenever there is a SIE interception, which is done in step 54 by the CPU (which is executing the SIE instruction) detecting a type of instruction or special condition which cannot be handled under SIE execution but which requires the intervention of a supervisory control program, i.e. VM/PMP in this case. There are two types of conditions of primary interest for causing SIE interceptions that deal with I/O handling. They are: (1) a start I/O (SIO or SIOF) instruction or (2) an I/O interruption enablement condition. Thus, step 54 in FIG. 5 includes the CPU detection of a SIO or SIOF for starting an I/O device in which case the main stream operation in FIG. 5 is taken to step 56 to locate the LDEV/P-DEV/ORB blocks pertinent to starting the requested I/O device. Also if step 54 detects an I/O interruption enablement (such as a set system mask instruction that sets on the I/O enablement bit in the current PSW in the state descriptor (SD) for the current UPS guest), step 54 takes exit C to FIG. 6. However, if step 54 detects some other type of intercept condition not pertinent to the subject invention, then exit 55 is taken which is handled by means not within the scope of this invention.

If a SIO or SIOF instruction caused the interception, then step 56 is entered to find a particular LDEV block by having the VM/PMP program use the LDEV list pointer in the current GCB (e.g. GCB 210 in FIG. 2). It locates the LDEV pointer list in the pertinent UPS control area in FIG. 2. Then the VM/PMP program uses the I/O address specified in the SIO or SIOF instruction as an index into the LDEV pointer list to obtain the pointer adress to a required LDEV 135 of the type shown in FIG. 8, which is in the pertinent UPS control area in FIG. 2. In the accessed LDEV, a PDEV pointer is found which locates a PDEV block 133 in FIG. 8 for the requested I/O device. (There is only one PDEV block for the device, there will be as many LDEV blocks for an I/O device as there are guests sharing the same I/O device). VM/PMP can manipulate any LDEV block for a guest even though the corresponding PDEV block is busy.

The PMP program also accesses an ORB (operation request block) associated with the accessed LDEV block. Then PMP step 57 loads into the LDEV/ORB block a number of fields which are obtained from the respective guest's CAW and the guest's page zero, which are: (1) the UPS guest's protect key field, and (2) the guest's channel program address.

Then in FIG. 5, step 58 sets on a PDEV lock byte by means of a conventional type of compare and swap routine which may spin until the required lock is set on.

Figure 7:
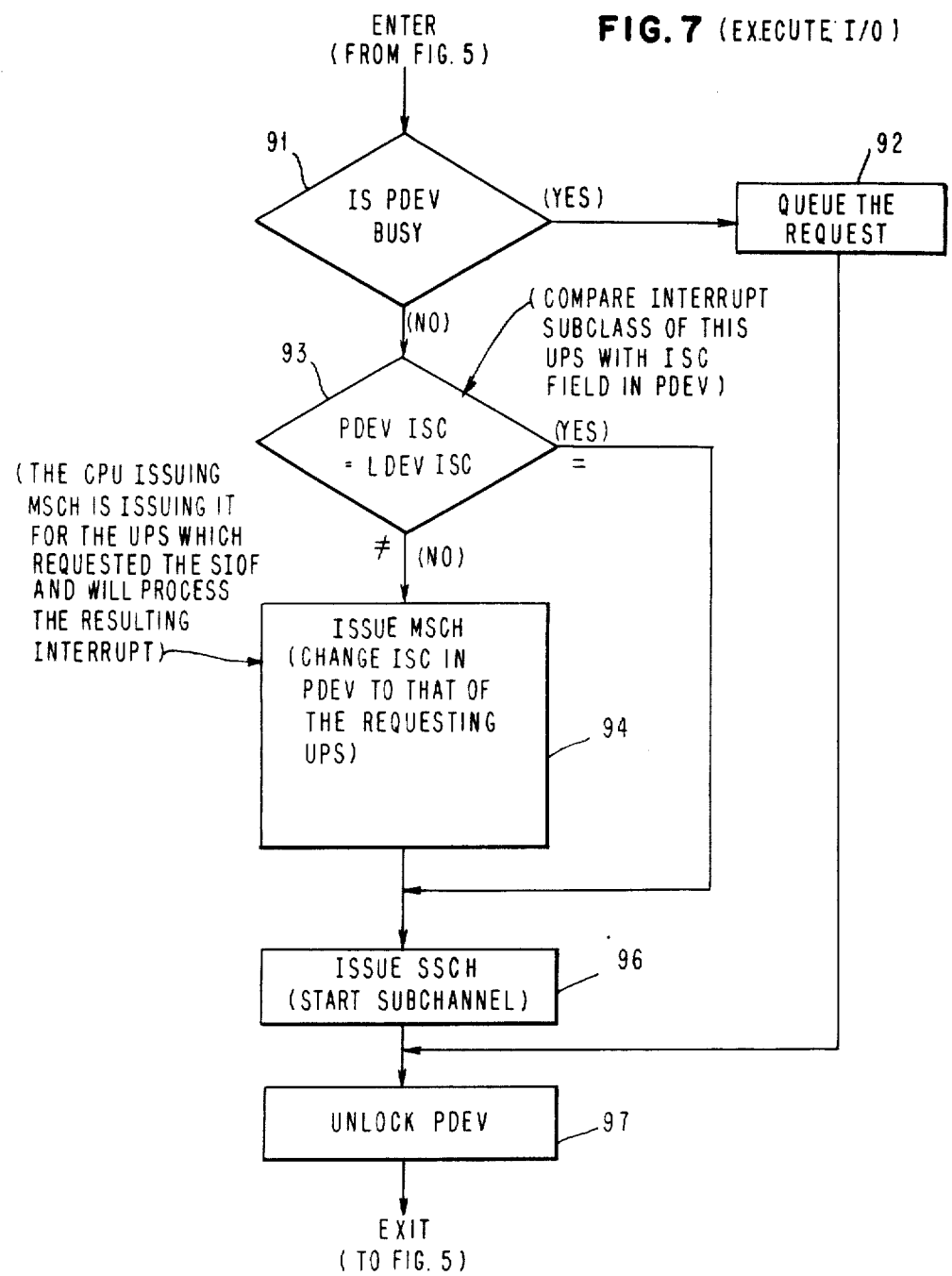
FIG. 7 is a flow diagram illustrating a start I/O routine for starting a channel program in the preferred embodiment of FIG. 5.

Then step 59 is entered to start the requested I/O device, which is controlled by a routine illustrated in detail in FIG. 7. The first step 91 of this routine tests a busy bit in the corresponding PDEV block 133. If the bit is on, then the represented I/O device is busy and cannot now be used by the current request, in which case the yes exit is taken to step 92 which enters the request on an I/O queue 134 in FIG. 8 which is pointed to by a device queue pointer in the PDEV block 133. Then the PDEV block 133 is unlocked by step 97, and an exit is taken back to FIG. 5 where the exit from step 59 causes VM/PMP to again issue SIE to continue the execution of the same UPS guest program on this same CPU.

However in FIG. 7, step 91 may find that the PDEV busy field is off in PDEV 133, indicating the device is not busy. In this case, the no exit is taken to step 93 which determines if the PDEV is currently assigned to this UPS. This is done by comparing the LDEV ISC for this UPS with an ISC field in the PDEV 133 (FIG. 8). If they compare equal, the yes exit is taken to step 96 to issue a 370-XA start subchannel (SSCH) instruction to start the I/O device. On the other hand, if the ISCs compare unequal, step 94 is entered to issue a 370-XA modify subchannel (MSCH) instruction to change the ISC in the subchannel to the ISC for this UPS. The PDEV ISC is then updated to correspond to the LDEV ISC. Then step 96 is entered to execute the SSCH instruction that finally starts the subchannel.

Then step 97 unlocks the PDEV so that it may be used by another requesting UPS which shares the device.

Thus, any UPS can access any unlocked PDEV even though the device is busy to overlap its manipulation of the PDEV with the device operation. However, if the new I/O requestor finds the busy bit on in the PDEV and the request is put on the device queue, the new request will not be able to access the I/O device until a later I/O interruption from that device causes the I/O request queue to be examined for existing I/O requests for the device.

Step 97 exits to FIG. 5 to cause a reissuance of the SIE for a continuation of the execution of the UPS code for this guest.

Eventually, the started I/O device will reach a point in its operation where it will generate an I/O interruption signal to this CPU. An I/O interruption can occur only when the I/O interruption subclass-mask bit associated with the subchannel is one and the CPU is enabled for I/O interruptions. If the channel subsystem established the priority among requests for interruption from subchannels while the CPU was disabled for I/O interruptions, the interruption occurs immediately after completion of the instruction enabling the CPU and before the next instruction is executed, provided that the I/O interruption subclass mask bit associated with the subchannel is one.

The interruption causes the current PSW to be stored as the old PSW at the CPU PSA real location 56 and causes the I/O interruption code associated with the interruption to be stored at real locations 184–191 in the CPU PSA allowing the interruption. Subsequently, a new PSW is loaded from real location 120, and processing resumes in the CPU state indicated by that PSW. The subchannel causing the interruption is identified by the interruption code. The I/O interruption code has the format defined in IBM Publication Form No. SA22-7085-0.

An interruption response block (IRB) is the storage operand of a test subchannel (TSCH) instruction. The two low order bits of the IRB address are zeros, specifying the IRB on a word boundary. The IRB contains three major fields: the subchannel status word (SCSW), the extended status word (ESW), and the extended control word (ECW).

Thus, the I/O interruption signal will cause a hardware interruption operation of the respective CPU. The CPU's PSA is found in the VM/PMP area by using the absolute address in the CPU's prefix register to locate the CPU PSA. The new I/O PSW address in that PSA causes step 60 in FIG. 5 to be entered to access the I/O interruption parameter for the device shown in FIG. 8. Bit position 137 of the interruption parameter is tested to determine if the device is a UPS or VM device in step 61. If it is a VM device, a branch is taken to the VM control program to handle the I/O interruption which is then done in the conventional manner not pertinent to the subject invention. If it is a UPS device, then the interruption parameter is the address of the LDEV and step 62 is entered to access the PDEV from a PDEV pointer in the LDEV.

Then step 63 is entered to set the PDEV lock. Step 64 executes a test subchannel (TSCH) instruction which obtains the SCSW at the TSCH operand location in MS.

Then step 66 determines if the I/O enablement bit is on in the guest current PSW in the guest SD (which is found in that guest's VMD). If the guest is not enabled for I/O interruptions, then the no exit is taken from step 66 to step 67, in which case the PMP program sets on an interrupt flag in that guest's SD, queues the I/O interruption in the related LDEV by storing the SCSW (subchannel status word) of the interruption in the LDEV, and chains the LDEV into the I/O interruption queue for that UPS guest. Then step 69 is entered to access the start I/O request queue 134 to determine if there is any start I/O request in the start I/O queue of the PDEV for this I/O device. If yes, step 71 causes the start I/O routine in FIG. 7 to be executed in the manner previously explained. One I/O request at the top of the start I/O queue of the PDEV is executed. If no start I/O request is found, step 70 is entered to set the lock field off in the PDEV, and step 72 is entered to test the work ready flags in the VMD for the current guest. If all the work ready flags are off, then the guest is not runnable, and exit B is taken from FIG. 5 back to FIG. 4 to determine if there is any other work ready for this CPU in the VMD list. On the other hand, if any work ready flag is on, the yes exit is taken from step 72 in FIG. 5 to again issue the SIE instruction to continue the guest's UPS code execution.

However, if in FIG. 5 step 66 finds that the guest is enabled for I/O interruption, the yes exit is taken to step 68 to handle the I/O interruption for this UPS guest by VM/PMP executing a programmed simulation of the I/O interruption. The I/O interruption simulation involves reading the guest current PSW found in the SD in the guest's VMD and then writing the guest's current PSW into the old I/O PSW location in the guest's page zero of the respective UPS region. Then, the new I/O PSW is read from the guest's page 0 and written into the guest's SD current PSW location. Also, the SCSW (which in step 64 was read by TSCH instruction execution) is copied into the CSW location in the guest page 0. Then, step 69 is entered, and it operates as previously explained.

Figure 6:
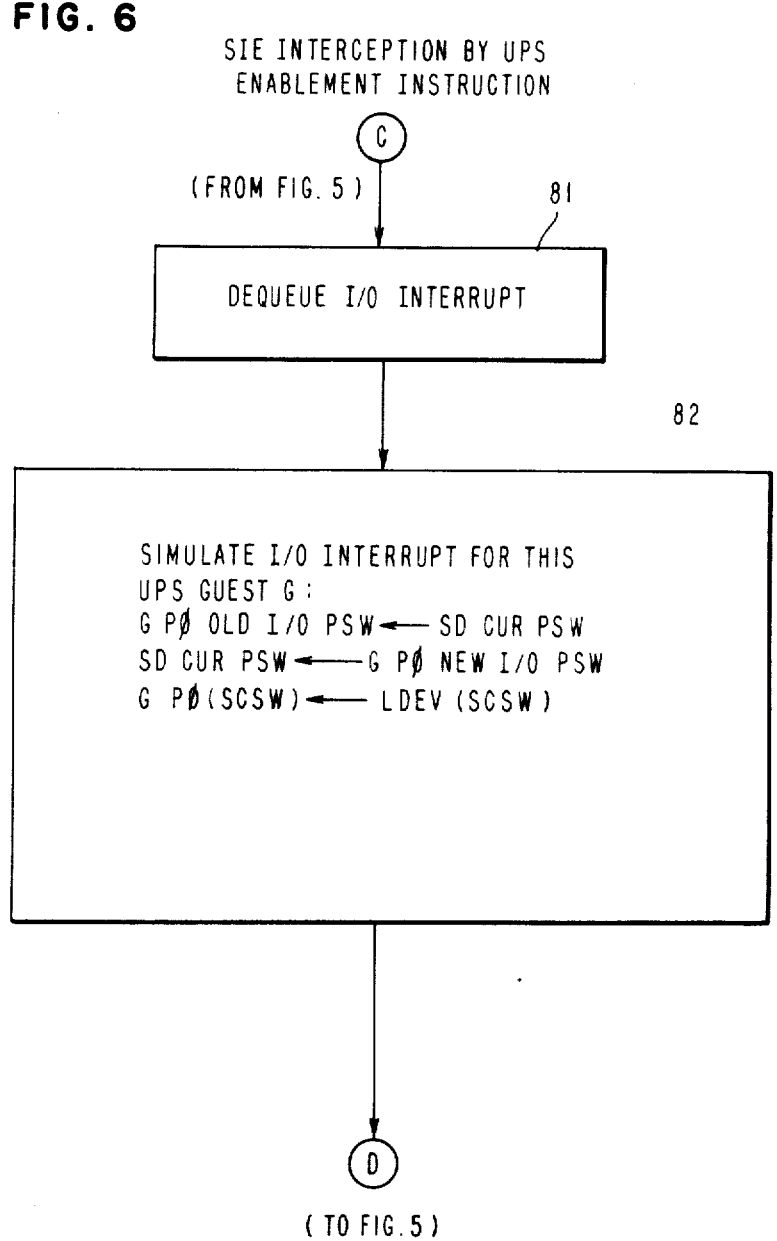
FIG. 6 is a flow diagram representing an I/O interrupt dequeueing routine which is entered from FIG. 5.

Whenever the SIE interception step 54 in FIG. 5 is due to an I/O enablement being detected, then FIG. 6 is entered from exit C at step 81 to dequeue the I/O interruption (i.e. SCSW) currently at the top of the I/O interruption queue located by the guest's I/O interruption pointer shown in FIG. 2. It is possible that the guest was disabled for a number of I/O interruptions which were queued by step 67 in FIG. 5 into the I/O interrupt queue for the guest's I/O devices. A pass through the programming represented by FIG. 6 causes a single I/O interruption (SCSW) at the top of that queue to be serviced by the PMP program. This involves the interrupt being dequeued by step 81 of VM/PMP, and step 82 having VM/PMP simulate the interruption for the guest. This is done by copying the guest's current PSW field (from the SD in the respective guest's VMD) into the guest's old I/O PSW field in this guest's page zero at the beginning of the guest's MS region. Then the guest's new I/O PSW in the guest's page zero is written into the guest's current PSW position (in the guest's SD). Finally, the SCSW from the LDEV which was dequeued by step 81 is written into the CSW PSW location for the guest's page zero.

Then exit D is taken back to step 52 FIG. 5 to resume the execution of the guest UPS program by again issuing the SIE instruction and executing the UPS code.

Although this invention has been shown and described with respect to plural embodiments thereof, it should be understood by those skilled in the art that various changes and omissions in the form and details of the invention may be made therein without departing from the spirit and the scope of the invention.

Having thus described our invention, what we claim as new, and desire to secure by Letters Patent is:

1. A control method for a multiprocessor (MP) system having plural CPUs sharing a main storage (MS) and I/O processing means for connecting a plurality of I/O devices to MS, the control method enabling the MP to execute a uniprocessor programming system (UPS) simultaneously on plural CPUs in the MP, even though the UPS is designed to only execute on a uniprocessor (UP) system having the same or a different architecture than the MP, the MP control method comprising:

having plural copies of the UPS in the MS, each copy of the UPS containing an identical set of UPS addresses within a range from UPS address zero to a maximum UPS address determined by the number n of bit positions in each address programmed into the UPS, and n being the order of the highest-order bit position in any explicit UPS address, locating a different UPS copy boundary for the UPS address zero of each of the plural copies of the UPS, the UPS copy boundaries being different multiples of $2^n$ bytes at different boundary MS absolute addresses, executing a plurality of UPS guests simultaneously on different CPUs in the MP under control of a MP control program executable in all CPUs of the MP as a system host, the UPS guests using UPS programs fetchable from the respective UPS copies in MS for execution on the CPUs in the MP, providing shareability of the I/O devices for the plurality of UPS guests through a set of shared physical paths.

2. A MP control method as defined in claim 1, further comprising:

generating a zone value for each UPS guest by selecting high-order bit positions exceeding order n in the boundary MS absolute address for the respective UPS copy of the UPS guest, ORing or concatenating the zone value for each UPS guest with UPS addresses obtained from a respective UPS copy by a UPS guest to translate the UPS addresses to MS absolute addresses needed for executing the respective UPS guest in the MP.

3. A MP control method as defined in claim 2, further comprising:

writing the zone value in a field in a control block in MS accessible to I/O processing means that executes channel programs for a respective UPS guest by obtaining the channel programs from a respective UPS copy in MS, accessing by the I/O processing means of the I/O channel programs in the respective UPS copy in MS with UPS channel program addresses generated by ORing or concatenating the zone value for the respective UPS guest to the high-order end of each UPS channel program address obtained from the respective UPS copy for the I/O processing means, whereby system performance of the executing UPS guests is enhanced by enabling direct execution of UPS channel programs, and by thereby avoiding CPU software address translation of the channel program addresses by copying the channel program to another area in which the channel program addresses would have been modified to the absolute addresses representing the actual location of the channel program and the data areas addressed by the channel program in MS.

4. A MP control method as defined in claim 3, further comprising:

emulating an architecture state required by a UPS guest while the UPS guest is executing an associated UPS copy in a CPU, a state descriptor (SD) defining the system architecture state for which the UPS was designed, the CPU emulating the architecture state by operating under the SD while executing the UPS guest, temporarily terminating the emulating architecture state for the CPU when an executing UPS guest requests an I/O device to be started or enables I/O interruptions from I/O devices started by the executing UPS guest, initiating the MP control program to start the requested I/O device or service an I/O interruption for the executing UPS guest, continuing the emulating architecture state when the MP control program has completed the starting of the I/O device or has serviced an enabled I/O interruption.

5. A MP control method as defined in claim 4, the MP control program further comprising:

putting a start I/O request by a UPS guest on a start I/O request queue for an I/O device, when the UPS guest makes the start I/O request while the I/O device is busy, also putting an I/O interruption description on an I/O interruption queue for a UPS guest that started the I/O device causing an I/O interruption, when the I/O interruption occurs while I/O interruptions are disabled for the UPS guest, handling any start I/O request on the start I/O request queue for the I/O device in response to any I/O interruption for the I/O device when the device goes non-busy.

6. A MP control method as defined in claim 5, the MP control program further comprising:

dequeueing any unserviced I/O interruption description on the I/O interruption queue for any UPS guest in response to a termination of emulation (SIE interception) due to I/O enablement, simulating the I/O interruption for the UPS guest by executing instructions that transfer the I/O interruption description from the I/O interruption queue to a program save area (PSA) in the guest's UPS copy in MS.

7. A MP control method as defined in claim 6, the MP control program interruption simulating submethod further comprising:

accessing by the MP control method of: (1) a state descriptor (SD) associated with a virtual machine definition (VMD) block for the UPS guest for which the SD defines the emulating architecture state of the CPU executing the UPS guest, the SD including a current PSW location for the UPS guest, and (2) a PSA for the UPS guest in the guest's UPS copy, the PSA page including a new I/O PSW location, an old I/O PSW location, and a channel status word (CSW) location for receiving status information about the I/O interruption, reading the content of the current PSW location from the guest's SD, and writing the content into the old I/O PSW location in the guest's PSA, also reading the new I/O PSW location from the guest's PSA, and writing the content into the current PSW location in the guest's SD, furthermore reading the I/O interruption description from the I/O interruption queue, and writing that description into the appropriate locations in the guest's PSA.

8. A MP control method as defined in claim 5, having a shareable I/O submethod comprising:

providing a physical device (PDEV) control block in MS for each I/O device useable by the MP, also providing a plurality of shareable logical device (LDEV) control blocks in MS for a respective plurality of UPS guests, each LDEV in the shareable set of LDEVs having a pointer for locating the same PDEV for an I/O device useable by the sharing UPS guests.

9. A MP control method as defined in claim 8, having a start I/O submethod comprising:

finding a LDEV for a UPS guest providing a start I/O request for an I/O device useable by the UPS guest, locating an associated PDEV for a required I/O device by using the PDEV pointer in the found LDEV, setting a lock field for the located PDEV before changing any field in the PDEV, testing the state of a busy field in the located PDEV to determine if an associated I/O device is currently busy, inserting the start I/O request into a start I/O request queue for the I/O device if the testing of the busy field finds a busy state to exist, unlocking the lock field for the PDEV in response to inserting the start I/O request into the start I/O request queue.

10. A MP control method as defined in claim 9, the start I/O submethod further comprising:

sensing the busy field in a PDEV being pointed to by a LDEV selected by a guest's start I/O request, the PDEV busy field indicating an unbusy state for the associated I/O device, testing a guest affiliation field in the PDEV for indicating a current I/O device affiliation with a particular UPS guest, copying into the guest affiliation field in the PDEV an affiliation field in the LDEV if the testing does not indicate a PDEV affiliation with the UPS guest having the start I/O request, issuing a start subchannel instruction (SSCH) for the UPS guest having the start I/O request to enable the starting of the I/O device, unlocking the lock field for the PDEV in response to the issuing of the SSCH instruction.

11. A MP control method as defined in claim 10, the start I/O submethod further comprising:

having a hardware affiliation field in each CPU dedicatable to a UPS guest also having a hardware affiliation field for each I/O device, issuing a modify subchannel (MSCH) instruction to set a value in the affiliation field for the I/O device providing an I/O interrupt to the affiliation value of a CPU which requests a related operation to direct the I/O interrupt to that CPU.

12. A MP control method as defined in claim 10, the start I/O submethod further comprising:

initializing the zone value in a zone field in a MS control block (ORB) associated with each LDEV when each LDEV is initialized for each UPS guest, microcode ORing or concatenating the content of the zone field with each UPS I/O channel program address provided to an I/O channel from the UPS copy in order to translate each obtained UPS I/O channel program address to a MS absolute address which can access a required MS location in the UPS copy in MS being used by the UPS guest.

13. A MP control method as defined in claim 5, further comprising:

searching by any executing CPU in the MP of a list of dispatcher control blocks (VMDs) in MS, the list having a VMD for each virtual machine useable on the MP system, each UPS guest being associated with a corresponding VMD and a corresponding UPS copy in MS, the search accessing the VMDs, one at a time in a predetermined order to determine the dispatching of work on the CPUs of the MP indicated by the VMDs, determining that work for a VMD being searched is not dedicated exclusively to execution on a particular CPU if the VMD is found not to have a CPU identifier value in a CPU ID field, and if no CPU identifier is found in the VMD CPU ID field, the VMD is for a non-dedicated guest, locating a CPU PSA (program save area) in MS for the executing CPU by using a prefix address associated with the executing CPU, examining the state of a CPU dedication field in the CPU's PSA, and if no dedication state is therein indicated, the executing CPU is a non-dedicated CPU which can execute work for a non-dedicated guest, but if a dedication state is indicated, the executing CPU can only do work for a dedicated guest, comparing a CPU ID in the CPU dedication field in the PSA for the executing CPU with the content of the CPU ID field in the VMD being searched, the executing CPU being a dedicated CPU required to execute all work of that VMD if the CPU IDs compare equal.

14. A MP control method as defined in claim 13, further comprising:

sensing a UPS MP field (PMP field) in a VMD being searched if the executing CPU has been found to be either: (1) dedicated to the VMD being searched, or (2) non-dedicated and the VMD is found non-dedicated, then if the UPS MP field is sensed to have a UPS state, executing on this CPU any ready work for the searched VMD's UPS guest, but otherwise if no UPS state is sensed in the UPS MP field, executing any ready non-UPS work on this CPU.

15. A MP control method as defined in claim 14, further comprising:

locking the list of dispatcher control blocks (VMDs) by any executing CPU that sets on a lock field for the list, and unlocking the list by the executing CPU resetting the lock field to an unlocked state when the executing CPU has found a VMD with ready work for the executing CPU or no VMD in the list is found to have ready work for the executing CPU.

16. A MP control method as defined in claim 4, further comprising:

having a first UPS copy in MS with UPS address zero being located at MS absolute address zero to provide a first UPS copy boundary, a first UPS guest virtual machine capable of executing a first guest on a CPU of the MP using the first UPS copy, the CPU emulating the architecture on which the UPS was designed to execute, the first UPS guest being a UPS program obtained from the first UPS copy, also having a zero value in a zone field associated with each logical device (LDEV) control block provided for each I/O device useable by the first UPS guest, emulating the first UPS guest virtual machine on the CPU executing the first guest while directly using UPS addresses obtained from the first guest's UPS copy as MS absolute addresses without requiring address translation of the UPS addresses in order to access MS by either the emulating CPU or by an I/O processor means executing an I/O channel program for the first guest.

17. A MP control method as defined in claim 16, further comprising:

having a next UPS copy in MS at a next UPS copy boundary address that is an MS absolute address which is the next integer multiple of $2^n$ beginning with an integer multiple of one, the next UPS copy to be used by a next UPS guest virtual machine capable of executing the next UPS guest on a CPU emulating the architecture on which the UPS was designed to execute, the next UPS guest being a UPS program obtained from the next UPS copy, also having the zone value equal to the integer multiple generated for the respective UPS copy in a zone field associated with each logical device (LDEV) control block provided for each I/O device useable by the next UPS guest, providing a segment table (ST) and page tables (PTs) in MS for translating the UPS addresses obtained from the UPS program in the next UPS copy into MS absolute addresses for an executing CPU to enable the next UPS guest to access required locations in the next UPS copy when the emulating CPU is requesting storage accesses into the next UPS copy, translating by the executing CPU of the UPS addresses obtained directly from the next UPS copy into MS absolute addresses by the CPU using the ST and PTs provided for the next UPS guest, also translating by an I/O processor means of I/O addresses in MS for the next UPS copy by concatenating zeros to the leftmost end of each I/O address and ORing the concatenated zeroes with the zone field associated with each LDEV for the next UPS guest.

18. A MP control method as defined in claim 8, further comprising:

setting an affiliation field in each LDEV of a UPS guest to an affiliation value, the affiliation values being different for different UPS guests, also setting a register in a CPU assigned to execute a UPS guest to an affiliation value provided to the affiliation field of LDEVs associated with the UPS guest.

19. A MP control method as defined in claim 18, further comprising:

selecting a different I/O interruption subclass code (ISC) under 370-XA architecture as the affiliation value for setting: (a) the affiliation fields in each UPS guest's LDEVs and (b) a control register in each CPU assigned to execute a UPS guest.

20. A MP control method as defined in claim 19, further comprising:

setting to a dedication state a dedication field in a program save area (PSA) for each CPU in the MP which is to be exclusively used by a UPS guest.

21. A MP control method as defined in claim 20, further comprising:

setting a CPU ID field in a VMD for a UPS guest to the CPU ID value for a CPU which is to be exclusively dedicated to the use of the UPS guest.

* * * * *